US012132263B2

(12) United States Patent
Tanaka

(10) Patent No.: US 12,132,263 B2
(45) Date of Patent: Oct. 29, 2024

(54) CIRCULAR AND LINEARLY POLARIZED ANTENNA

(71) Applicant: CANON KABUSHIKI KAISHA, Tokyo (JP)

(72) Inventor: Yu Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 17/187,494

(22) Filed: Feb. 26, 2021

(65) Prior Publication Data

US 2021/0280984 A1 Sep. 9, 2021

(30) Foreign Application Priority Data

Mar. 4, 2020 (JP) ................................ 2020-037064

(51) Int. Cl.

| | |
|---|---|
| ***H01Q 21/24*** | (2006.01) |
| ***H01Q 1/22*** | (2006.01) |
| ***H01Q 3/24*** | (2006.01) |
| ***H01Q 9/42*** | (2006.01) |
| ***H01Q 21/00*** | (2006.01) |
| ***H01Q 21/06*** | (2006.01) |

(52) U.S. Cl.
CPC ......... *H01Q 21/245* (2013.01); *H01Q 1/2216* (2013.01); *H01Q 3/24* (2013.01); *H01Q 3/247* (2013.01); *H01Q 9/42* (2013.01); *H01Q 21/0075* (2013.01); *H01Q 21/061* (2013.01); *H01Q 21/24* (2013.01)

(58) Field of Classification Search
CPC ........................................................ H01Q 9/42
See application file for complete search history.

(56) References Cited

U.S. PATENT DOCUMENTS 4,062,019 A * 12/1977 Woodward ............. H01Q 21/26 343/797
4,672,386 A * 6/1987 Wood ................... H01Q 21/205 343/846
4,814,777 A * 3/1989 Monser ................ H01Q 25/001 343/826

(Continued)

FOREIGN PATENT DOCUMENTS

CN 103190033 A * 7/2013 ............. H01Q 21/26
CN 108172984 A * 6/2018 ............... H01Q 1/24

(Continued)

*Primary Examiner* — Ab Salam Alkassim, Jr.
(74) *Attorney, Agent, or Firm* — Canon U.S.A., Inc. IP Division

(57) ABSTRACT

An antenna includes a control unit and first to Nth antenna elements. N is an integer that is four or more. The control unit controls input of signals to each antenna element. Among each antenna element, open ends of the second to Nth antenna elements extend in directions different from a direction in which the first antenna element extends. Among signals input to each antenna element, signals input to the second to Nth antenna elements have phases different from a phase of a signal input to the first antenna element. The control unit controls a state to be in a first state, where signals are input to each antenna element to radiate a circularly polarized wave in a first direction or a second state, where signals are input to one or more of the antenna elements to radiate a linearly polarized wave in a direction different from the first direction.

18 Claims, 7 Drawing Sheets

(56) References Cited

U.S. PATENT DOCUMENTS

| | | | | | |
|---|---|---|---|---|---|
| 4,916,457 | A * | 4/1990 | Foy | H01Q 13/106 | 343/768 |
| 5,406,292 | A * | 4/1995 | Schnetzer | H01Q 13/106 | 343/872 |
| 5,654,724 | A * | 8/1997 | Chu | H01Q 9/38 | 343/846 |
| 5,786,793 | A * | 7/1998 | Maeda | H01Q 21/0075 | 343/846 |
| 5,977,929 | A * | 11/1999 | Ryken | H01Q 21/24 | 343/797 |
| 6,356,242 | B1 * | 3/2002 | Ploussios | H01Q 9/42 | 343/846 |
| 11,128,035 | B2 * | 9/2021 | Driscoll | H01Q 3/247 | |
| 2003/0052834 | A1 * | 3/2003 | Sievenpiper | H01Q 21/26 | 343/753 |
| 2007/0139293 | A1 * | 6/2007 | Hasegawa | H01Q 11/08 | 343/895 |
| 2009/0073049 | A1 * | 3/2009 | Apostolos | H01Q 1/3275 | 343/700 MS |
| 2009/0303002 | A1 * | 12/2009 | Rossman | H01Q 21/26 | 340/10.1 |
| 2010/0280340 | A1 * | 11/2010 | Homan | A61B 1/041 | 600/302 |
| 2012/0098725 | A1 * | 4/2012 | Lytle | H01Q 21/26 | 343/797 |
| 2013/0201066 | A1 * | 8/2013 | Parsche | H01Q 19/10 | 343/743 |
| 2013/0229262 | A1 * | 9/2013 | Bellows | H01Q 21/24 | 343/853 |
| 2014/0191914 | A1 * | 7/2014 | Ju | H01Q 21/26 | 343/729 |
| 2015/0048995 | A1 * | 2/2015 | Andrenko | H01Q 21/00 | 343/893 |
| 2015/0263435 | A1 * | 9/2015 | Song | H01Q 21/26 | 343/810 |
| 2015/0357710 | A1 * | 12/2015 | Li | H01Q 21/065 | 342/174 |
| 2017/0264013 | A1 * | 9/2017 | Okayama | H01Q 3/24 | |
| 2019/0312335 | A1 * | 10/2019 | Franco | H01Q 1/243 | |
| 2020/0243968 | A1 * | 7/2020 | Behdad | H01Q 15/22 | |
| 2020/0366001 | A1 * | 11/2020 | Popugaev | H01P 5/227 | |
| 2021/0135365 | A1 * | 5/2021 | Tsutsumi | G01S 3/40 | |
| 2021/0296779 | A1 * | 9/2021 | Koganti | H01Q 1/42 | |
| 2022/0344823 | A1 * | 10/2022 | Panther | H01Q 25/001 | |
| 2023/0117822 | A1 * | 4/2023 | Chou | H01Q 19/106 | 343/702 |

FOREIGN PATENT DOCUMENTS

| | | | | |
|---|---|---|---|---|
| CN | 109273838 | A * | 1/2019 | |
| CN | 114696116 | A * | 7/2022 | H01Q 1/36 |
| JP | 2017-168891 | A | 9/2017 | |
| JP | 2018074345 | A * | 5/2018 | |
| WO | WO-2019064470 | A1 * | 4/2019 | H01Q 1/48 |
| WO | WO-2021104191 | A1 * | 6/2021 | H01Q 1/36 |

* cited by examiner

CIRCULAR AND LINEARLY POLARIZED ANTENNA

BACKGROUND

Field

The present disclosure relates to an antenna.

Description of the Related Art

An antenna designing method whereby antenna elements are disposed on a ground plane and a directivity perpendicular to the ground plane is imparted is available. This designing method brings the advantage that a structure on a side opposite to a side having the antenna elements is configured not to affect radiation characteristics. This is because, while waves are not radiated to an opposite side of the ground plane, the structure and each of the antenna elements are separated from each other by the ground plane.

As an example that makes the most of the above advantage, a wireless communication system that is usable even when being in the proximity of a human body or even when being placed on a metal surface has been proposed. As other such examples, various use cases such as a body-worn type wearable wireless communication system are being studied at present. Japanese Patent Application Laid-Open No. 2017-168891 discusses an antenna configured to impart phase differences to a plurality of antenna elements to switch between horizontal polarization and vertical polarization of waves traveling frontward from the antenna.

The technique discussed in Japanese Patent Application Laid-Open No. 2017-168891 contributes to an increase in a reading distance when a person performs operation in which the front side of the antenna is directed to objects that are being managed in a use case where the technique is applied to inventory management or the like.

However, the technique is difficult to be used in another use case where inventory management does not require a person to perform such operation and only requires a person who is holding the antenna to move around or objects to move around. For example, when the antenna is worn on a human body, the frontward direction of the antenna does not always the same as a direction in which the human body moves. The technique therefore does not contribute to an increase in a reading range.

SUMMARY

The present disclosure provides capable of radiating circularly polarized waves and linearly polarized waves to a wide range.

According to an aspect of the present disclosure, an antenna includes first to Nth antenna elements, where N is an integer that is four or more, and a control unit configured to control input of signals to each of the first to Nth antenna elements, wherein, among the first to Nth antenna elements, open ends of the second to Nth antenna elements extend in directions substantially 360/N degrees different from a direction in which the first antenna element extends, wherein, among signals input to the first to Nth antenna elements, signals input to the second to Nth antenna elements have phases that are substantially 360/N degrees different from a phase of a signal input to the first antenna element, and wherein the control unit controls input of signals in such a manner as to control a state to be a first state or a second state, wherein the first state is a state in which signals are input to the first to Nth antenna elements to radiate a circularly polarized wave in a first direction, and the second state is a state in which signals are input to one or more of the first to Nth antenna elements to radiate a linearly polarized wave in a direction different from the first direction.

Further features of the present disclosure will become apparent from the following description of exemplary embodiments with reference to the attached drawings.

DESCRIPTION OF THE EMBODIMENTS

Figure 1A:
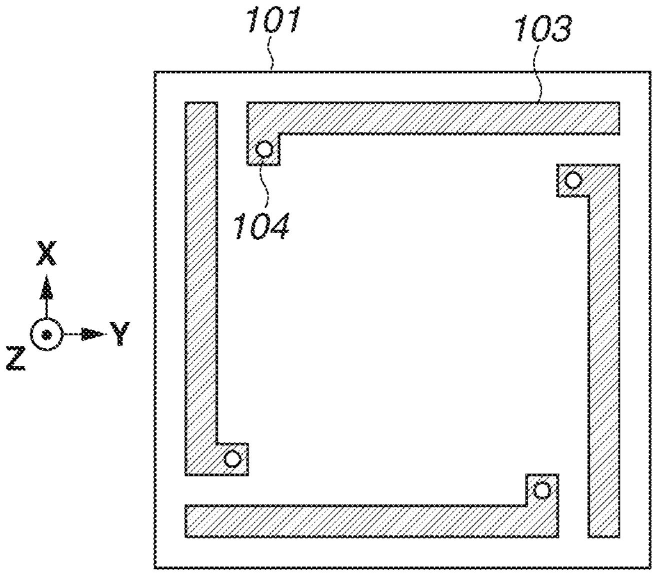
FIGS. 1A to 1D illustrate a configuration of an antenna according to a first exemplary embodiment.

A configuration of an antenna according to a first exemplary embodiment is illustrated in FIGS. 1A to 1D. The following description is based on an assumption that parts colored in the same shade in the drawings have the same function unless otherwise indicated. All configurations, including functions and mounted components not illustrated in the drawings, that produce the same effects as those illustrated in the drawings, fall within the scope of the present exemplary embodiment. A substrate 101 and a substrate 102 are laid on each other along a Z axis, which extends in the thickness directions of the substrates, in order in the negative Z-axis direction.

FIG. 1A illustrates a front face of the substrate 101. Four antenna elements 103 are disposed in such a manner that respective open ends thereof, which are end points thereof each extend, so as not to overlap each other, along either an X axis or a Y axis with the open ends of clockwise adjacent ones of the antenna elements 103 extending in directions substantially 90 degrees different from each other. The four antenna elements 103 are disposed also in such a manner that respective power feed ends thereof, which are opposite from the open ends thereof, are connected to vias 104. Each of the open ends may extend in an opposite direction. Each of the antenna elements 103 may be in a meanderingly folded shape.

Figure 1B:
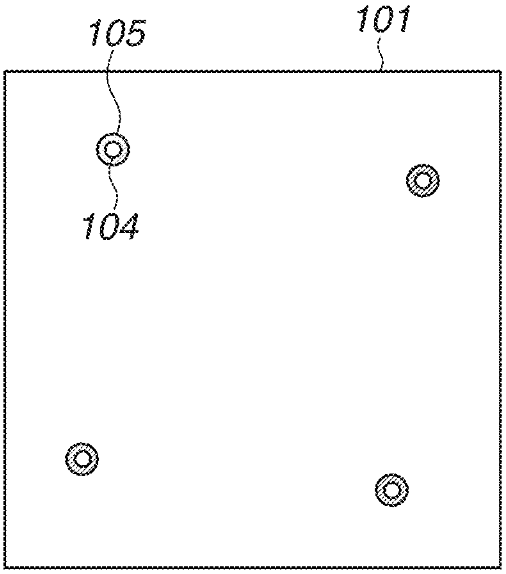

FIG. 1B illustrates a rear face of the substrate 101. The four vias 104 penetrate the substrate 101 to be connected to respective four pads 105.

Figure 1C:
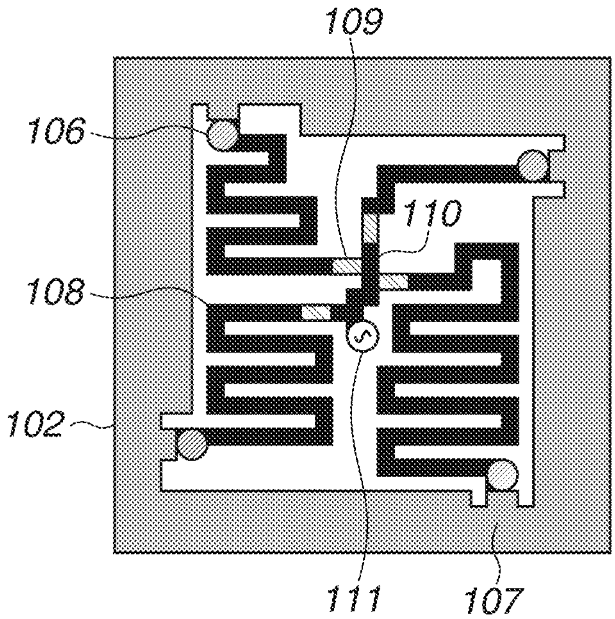

FIG. 1C illustrates a front face of the substrate 102. Four pads 106 are connected to a ground 107 and to four radio frequency (RF) lines 108. Each of the pads 105 and the pad 106 become electrically continuous to each other by making surface contact with a metal spacer that serves as a conduction part (not illustrated).

The conduction part may be alternatively made of a coaxial cable, a metal wire, or a metal screw as long as RF signal frequencies can be transmitted, and further may function as a support member to support the substrate 101 and the substrate 102. The pads 106 are connected to the ground 107 to assist in adjusting the phases of RF signals so that the antenna elements 103 can operate as the inverted-F type, and may therefore be left disconnected from the ground 107 in a case where the phase adjustment is not needed. The four RF lines 108 are connected to the transmission/reception unit 111 via the four RF switches 109 and further via a common RF line 110. Each of the RF switches 109 is controlled between forming a short circuit and forming an open circuit through connection of one end thereof to the RF line 108 and connection of the other end thereof to the RF line 110. This means that the RF switch 109, when forming a short circuit, allows an RF signal to pass through a path between the transmission/reception unit 111 and the antenna element 103, and, when forming an open circuit, does not allow an RF signal to pass through the path between the transmission/reception unit 111 and antenna element 103.

Figure 1D:
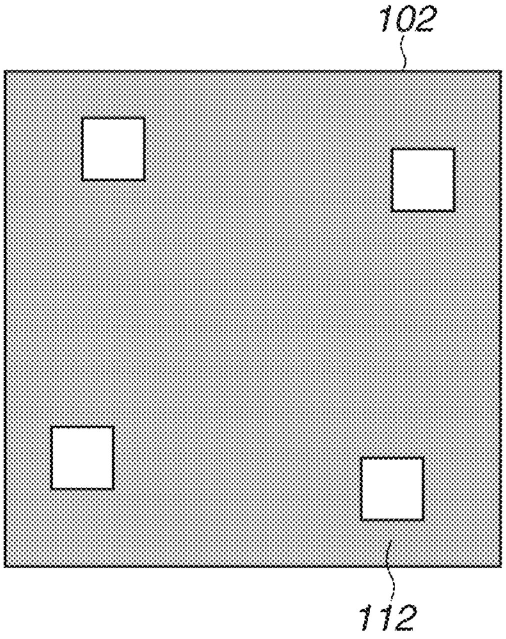

FIG. 1D illustrates a rear face of the substrate 102. A ground 112 is disposed on an entire surface expect for areas overlapping the pads 106 and is electrically continuous to the ground 107 via a plurality of vias (not illustrated) that penetrate the substrate 102. In this case, line widths and line thicknesses of the RF lines 108 and the RF lines 110 are determined based a layer structure of substrate 102 and a dielectric constant thereof so that the RF line 108 and the RF line 110 can have about 50 ohms with RF signal frequencies. The four pads 106 are denoted as A, B, C, and D counterclockwise in order from an upper right one in FIG. 1D. Total electrical lengths of the respective RF lines connecting A, B, C, and D to the transmission/reception unit 111 are denoted as a, b, c, and d. The four RF lines 108 are disposed in meanderingly folded shapes in such a manner as to satisfy the relationships $b=a+\lambda/4$, $c=b+\lambda/4$, and $d=c+\lambda/4$ and not to overlap the ground 107.

A phase difference between counterclockwise adjacent ones of the four RF lines 108 needs to be at least $\lambda/4$, that is, about 90 degrees. How the phase differences are imparted, such as in what rotational direction the RF lines 108 are positioned from one another or how the RF lines 108 are mounted, is not limited. The phase differences may be imparted without using the line lengths but by using a phase shifter.

An RF signal that is transmitted or received by the antenna is a circularly polarized wave when the RF signal is a complex wave made up of waves from the four antenna elements 103. The RF signal is a linearly polarized wave when the RF signal is a complex wave made up of waves from any two opposed ones of the antenna elements 103.

In the present exemplary embodiment, functions of members such as the antenna elements 103, the ground 107, and the RF lines 108 may be provided on a single multilayer substrate instead of separating the configuration of the antenna between the substrate 101 and the substrate 102. Similarly, the RF lines 108, the RF line 110, and the RF switches 109 do not need to be provided on the front face of the substrate 102 but may be provided on the rear face thereof or on an inner layer in a multilayer structure. In such a case, the metal spacer (not illustrated) serves as a via that connects one layer to another.

Figure 2:
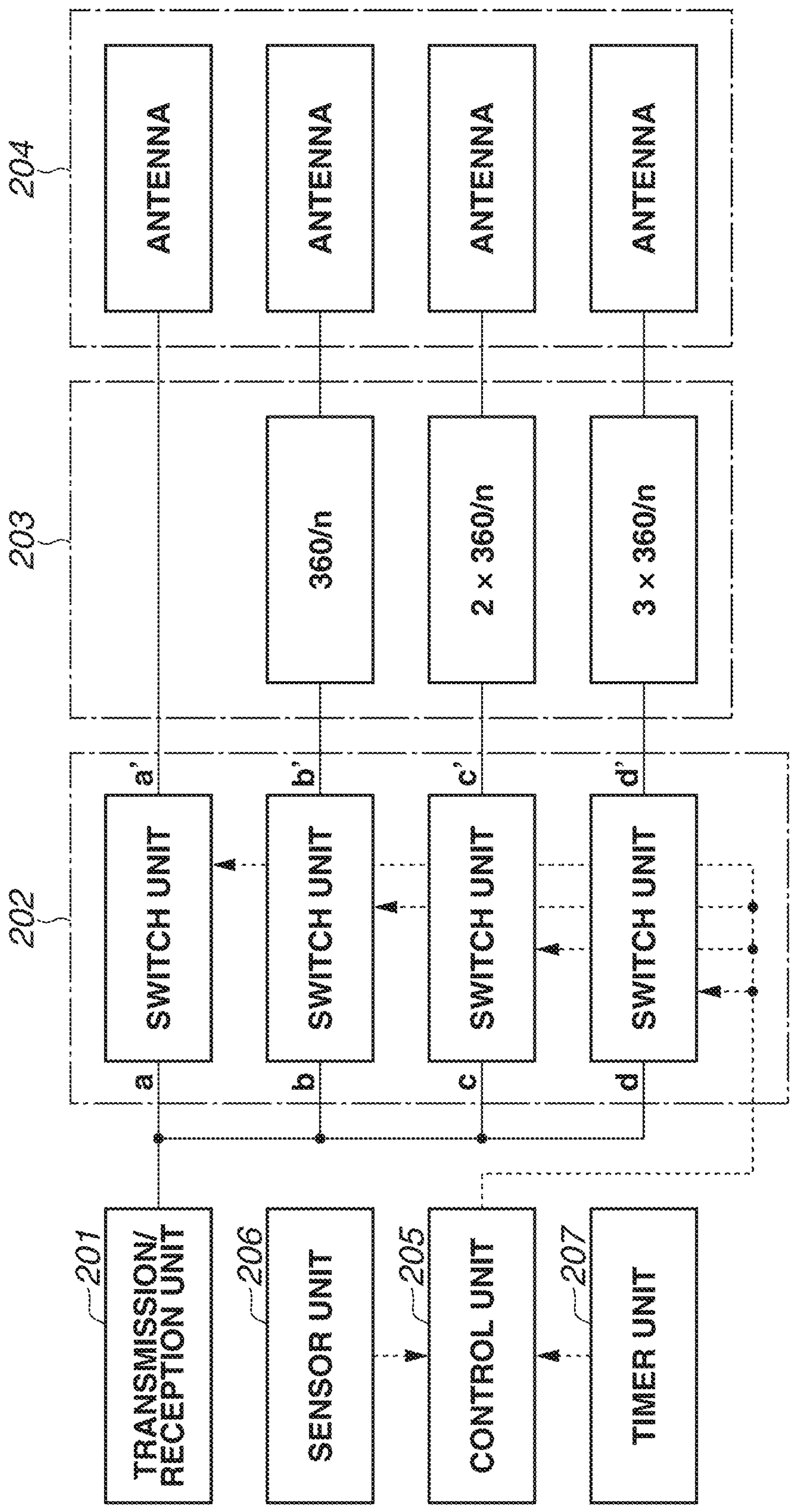
FIG. 2 illustrates functional blocks of the antenna according to the first exemplary embodiment.

Functional blocks of the antenna according to the present exemplary embodiment is illustrated in FIG. 2. The following description is based on an assumption that, in FIG. 2, paths through which RF signals pass are indicated by solid lines, paths through which signals that control specific functions and signals that exchange information pass are indicated by dotted lines, and definitions of specific functions and specific terms are indicated by dashed line.

In transmission by the antenna, an RF signal output by the transmission/reception unit 201 branches into four signals, and the four signals are then input to switch units 202 at contacts a, b, c, and d. The switch units 202 are the RF switches 109 in FIGS. 1A to 1D. The four switch units 202 connect the contact a and a contact a' to each other, the contact b and a contact b' to each other, the contact c and a contact c' to each other, and the contact d and the contact d' to each other. When the switch units 202 each form a short circuit, the RF signals output by the switch units 202 are input to a phase unit 203 through the contacts a', b', c', and d'.

The phase unit 203 rotates the respective phases of the four RF signals input thereto by substantially 0 degrees, 90 degrees, 180 degrees, and 270 degrees, and then outputs the obtained RF signals to antenna elements 204. The control unit 205 controls the four switch units 202 based on information from a sensor unit 206 and a timer unit 207. The control unit 205 includes one or more processors and executes various control programs to control the antenna, mainly the switch units 202. In this case, the sensor unit 206 detects an acceleration of the antenna and uses a result of the detection to estimate a direction of movement of the antenna.

Any sensor that is capable of detecting the direction of the movement and a current location of the antenna may be used as the sensor unit 206. Examples of a sensor that may be used as the sensor unit 206 include a global positioning system (GPS), a sensor to detect reflected power of the antenna elements 204, a sensor to detect the orientation of the antenna, a geomagnetic sensor, an acceleration sensor, and a sensor to perform a triangulation method based on a known place or signal. Two or more of the above sensors may be combined as appropriate into the sensor unit 206. The timer unit 207 provides a notification based on a current clock time or a previously set clock time.

In reception by the antenna, the functions of the individual blocks are the same as those in transmission, with the only difference being that RF signals reversely pass through the paths.

That is, RF signals received by the antenna elements 204 are input to the transmission/reception unit 201 through the phase unit 203 and the switch units 202. The number of signals into which an RF signal branches needs only to be an integer N that is four or more. In accordance with the number of signals into which an RF signal branches, the phase unit 203 imparts, to RF signals, phase differences of substantially 360/N degrees each between two of the RF signals.

When such phase differences are imparted, the control unit 205 can produce the same effect by controlling the switch units 202 after extracting, at least, contacts that correspond to the phase differences of 0 degrees, 90 degrees, 180 degrees, 270 degrees among the four or more branches.

Figure 3:
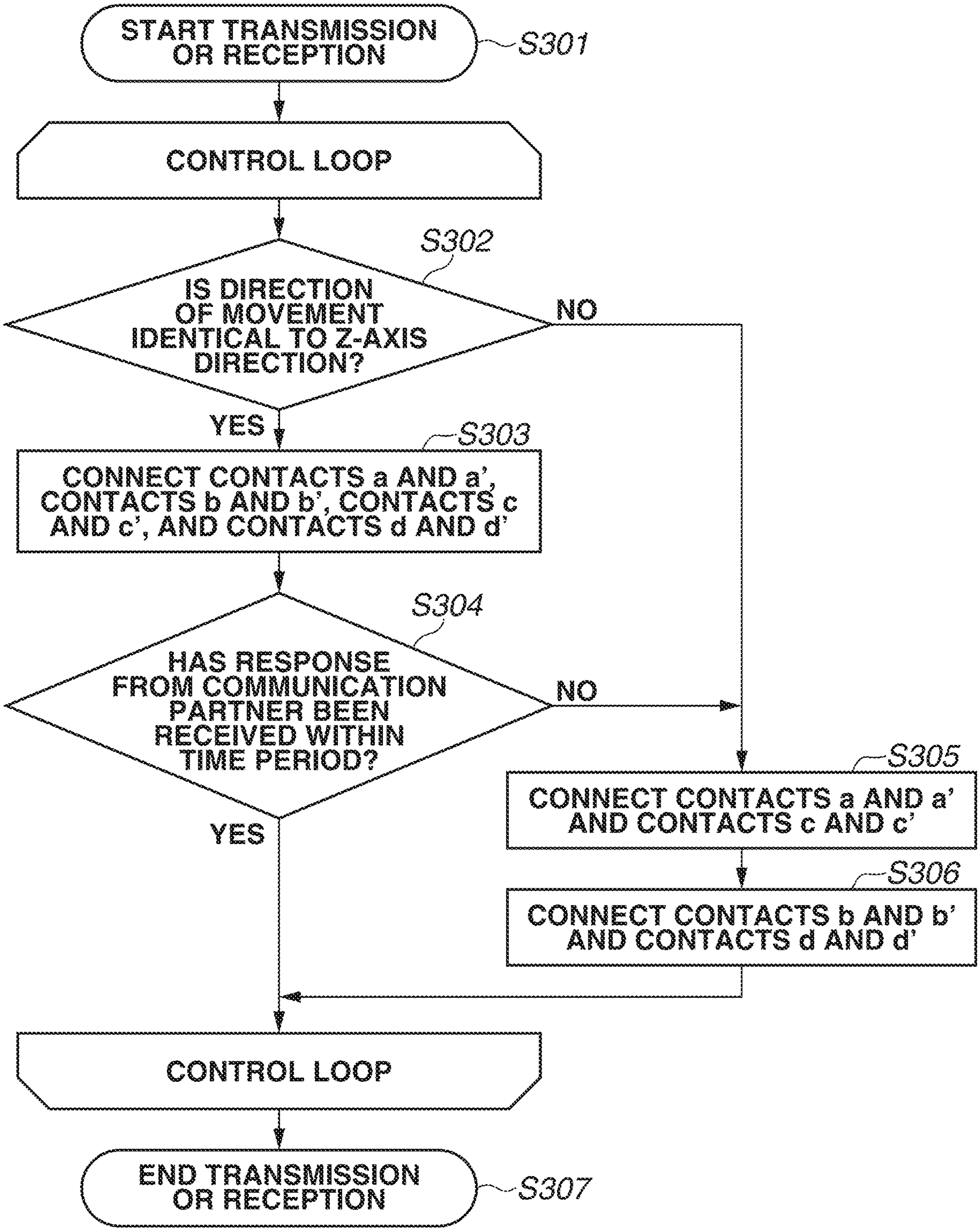
FIG. 3 is a flowchart illustrating operation of the antenna according to the first exemplary embodiment.

FIG. 3 is a flowchart illustrating operation of the antenna illustrated in FIG. 2. The flowchart in FIG. 3 is executed under the control of the control unit 205 included in the antenna.

From the start of transmission or reception of an RF signal (step S301) to the end of the transmission or reception (step S307), the control unit 205 mainly repeats executing control on the switch units 202 (steps S302 to S306).

At the start, the control unit 205 reads the direction of the movement of the antenna from the sensor unit 206, and determines whether the direction of the movement of the antenna is identical to the Z-axis directions (step S302). If the control unit 205 determines that the direction of the movement is substantially identical to the Z-axis directions (YES in step S302), the control unit 205 connects the contacts a and a' to each other, the contacts b and b' to each other, the contacts c to c' to each other, contacts d to d' to each other by controlling the switch units 202 (step S303). Subsequently, the control unit 205 reads a clock time from the timer unit 207 and determines whether a response from a communication partner has been received within a predetermined time period (step S304).

If the control unit 205 determines in step S302 that the direction of the movement is not identical to any of the Z-axis directions (NO in step S302), or if the control unit 205 determines in step S304 that a response has not been received (NO in step S304), the control unit 205 connects only the contacts a and a' to each other and the contacts c and c' to each other (step S305) and then connects only the contacts b and b' to each other and the contacts d and d' to each other (step S306) by controlling the switch units 202. The control unit 205 thereby performs control to input signals to some of the antenna elements 204. That is, the control unit 205 switches operation between inputting a signal to each of the antenna elements 204 and not inputting a signal.

In a case where the antenna has a configuration that includes a battery (not illustrated) to make the antenna portable, when the residual capacity of the battery is small, the control unit 205 may perform, for example, processing to reduce the frequencies at which the individual switch units 202 are switched.

The present operation sequence is merely an example. The control unit 205 may only implement any of steps S303, S305, and S306 in combination and may implement a different sequence of the steps. A sequence in which the control unit 205 does not perform any of the processing in steps S303, S305, and S306 if a response has not been received from a communication partner within the predetermined time period is also included.

The antenna according to the present exemplary embodiment is an antenna supposed to be applied to a radio frequency identifier (RFID) that uses circularly polarized waves. However, the antenna according to the present exemplary embodiment is also applicable as an antenna that is used for wireless communication such as a GPS or Wireless Fidelity (Wi-Fi)® or public wireless communication such as Long-Term Evolution (LTE).

In this case, a response received in step S304 in FIG. 3 is a reflected signal or a transmission signal from an RFID tag in the case of an RFID, a notification signal such as a beacon or a response signal such as ACK in the case of Wi-Fi®, or a transmission signal from a satellite in the case of a GPS.

The present exemplary embodiment enables an RFID system to have an increased reading range for reading RFID tags by radiating linearly polarized RF signals in the frontward, backward, leftward, and rightward directions of the antenna even when the direction of the movement of the antenna is different from the frontward direction thereof.

Even when it is impossible to read the RFID tag although the direction of the movement of the antenna is the same as the frontward direction of the antenna, the directions of radiation are automatically switched, so that the reading distance can be increased.

Figures 4A, 4B, 4C:
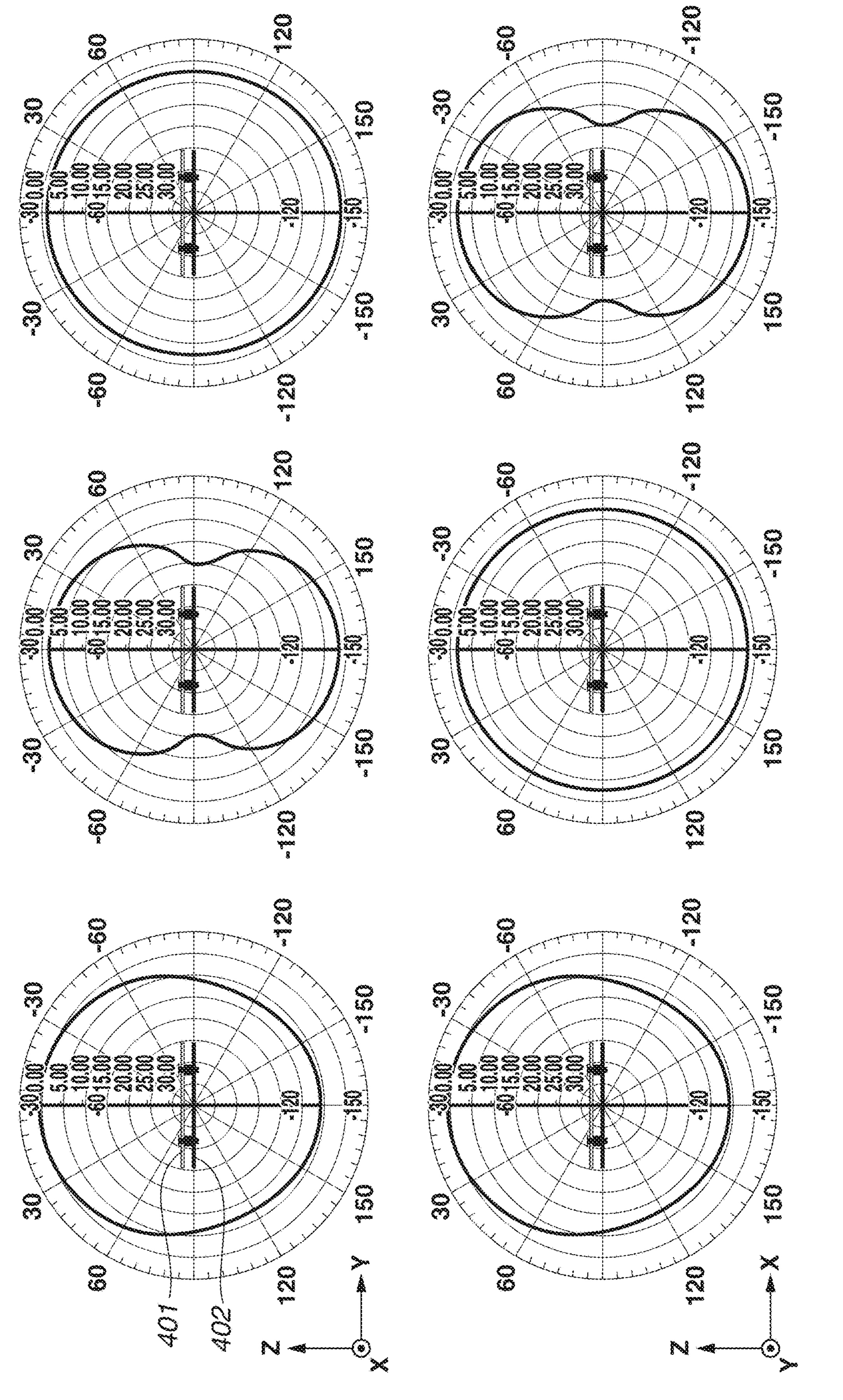
FIGS. 4A to 4C illustrate radiation characteristics of the antenna according to the first exemplary embodiment.

Radiation characteristics of an antenna according to the present exemplary embodiment that resonates at 920 MHz are illustrated in FIGS. 4A to 4C.

In this case, a substrate 401 and a substrate 402 have a substrate thickness of 1 mm and a relative permittivity of 4.3. A distance between the substrates 401 and 402 is 7 mm. The substrates 401 and 402 are separated at a distance of $\lambda/8$ or less and substantially in parallel with each other. A length of elements in an inverted-F type antenna is about $\lambda/4$, and a length of each side of the two substrates 401 and 402 is also about 24.

A line width of each RF line is 1.6 mm, and a line thickness thereof is 35 um.

FIG. 4A illustrates a radiation characteristic in step S303 of FIG. 3, indicating that circularly polarized RF signals with the main directivity in a positive Z-axis direction are radiated. FIG. 4B illustrates a radiation characteristic in step S305 of FIG. 3, indicating that linearly polarized RF signals are radiated in positive and negative X-axis directions. FIG. 4C illustrates a radiation characteristic in step S306 of FIG. 3, indicating that linearly polarized RF signals are radiated in positive and negative Y-axis directions.

As described above, switching the directivity of RF signals makes it possible to read RFID tags that are placed in the X-axis and Y-axis directions and that cannot be read only by radiating a circularly polarized RF signal in the positive Z-axis direction. Consequently, an RFID system can have a larger reading range.

Shapes, materials, and sizes provided herein are merely examples, and further size reduction of the antenna elements 103 by enclosure thereof in a highly dielectric body or by integral molding thereof with resin also falls within the present exemplary embodiment.

A configuration of an antenna according to a second exemplary embodiment is illustrated in FIGS. 5A to 5D. Description of the same parts as those in the first exemplary embodiment is omitted. A substrate 501 and a substrate 502 are laid on each other along a Z axis, which extends in the thickness directions of the substrates 501 and 502, in order in the negative Z-axis direction.

Figure 5A:
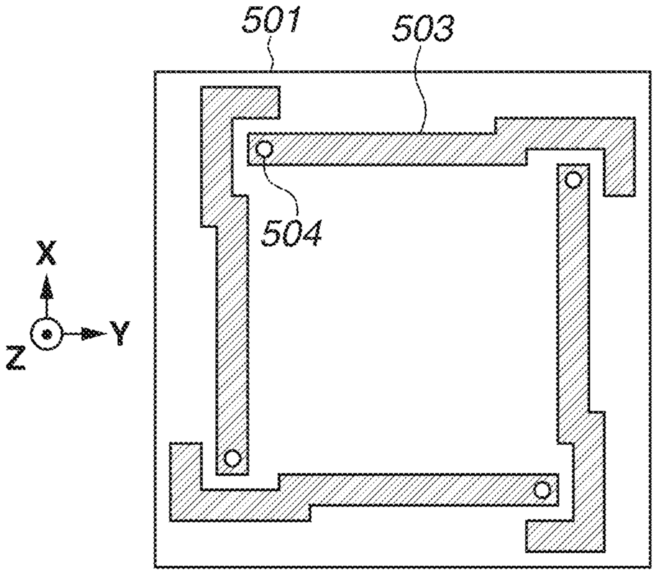
FIGS. 5A to 5D illustrate a configuration of an antenna according to a second exemplary embodiment.

FIG. 5A illustrates a front face of the substrate 501. Four antenna elements 503 are disposed in such a manner that respective power feed ends thereof, which are start points thereof, are connected to vias 504. The four antenna elements 503 are disposed to extend in directions substantially 90 degrees different from each other along an X axis or a Y axis so that open ends, which are end points, do not overlap each other and so as to surround the power feed ends of different ones of the antenna elements 50.

Figure 5B:
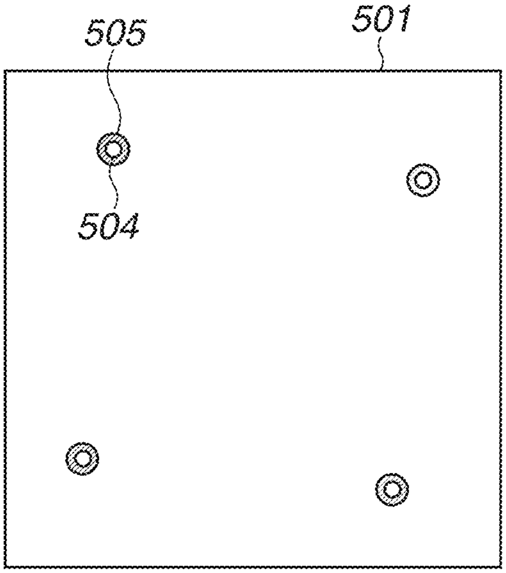

FIG. 5B illustrates a rear face of the substrate 501. The four vias 504 penetrate the substrate 501 to be connected to respective four pads 505.

Figure 5C:
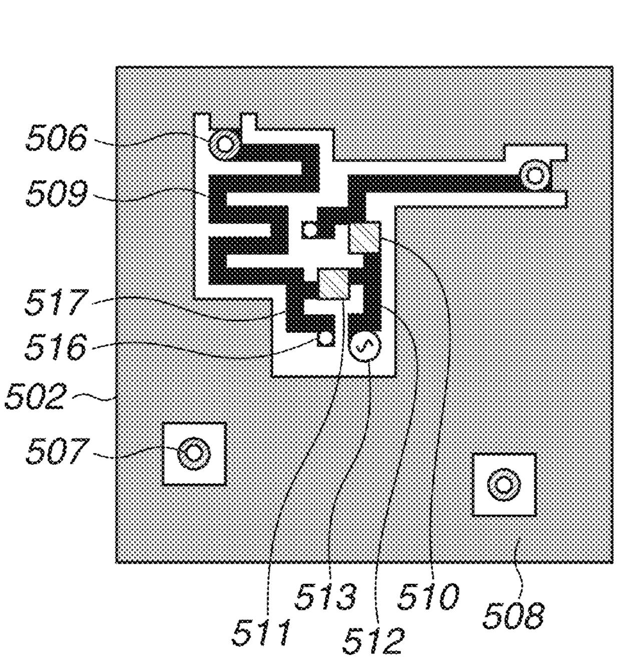

FIG. 5C illustrates a front face of the substrate 502. The positions at which the four pads 506 are placed are denoted as A, B, C, and D counterclockwise from the upper right one in FIG. 5C. The pads 506 are connected to the vias 507, which penetrate the substrate 502, at the positions A, B, C, and D. The pads 506 are connected to the ground 508 and an RF line 509 at the position A and to the ground 508 and another RF line 509 at the position B. Each of the RF lines 509 are connected to the transmission/reception unit 513 via the RF switch 510 or 511 and further via the common RF line 512.

Figure 5D:
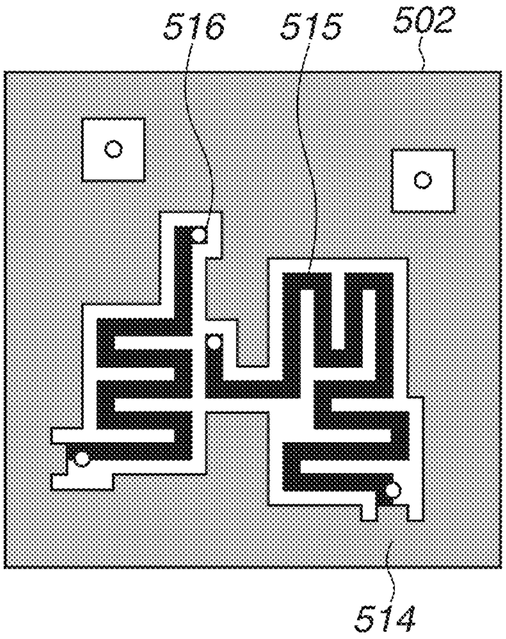

FIG. 5D illustrates a rear face of the substrate 502. The vias 507 are connected to the ground 514 and an RF line 515 at the position C, and connected to the ground 514 and another RF line 515 at the position D. A ground 514 is disposed on the entire surface so that the ground 514 is not to be electrically continuous to each of the vias 507 at the positions A and B, and is electrically continuous to the ground 508 via a plurality of vias (not illustrated) that penetrate the substrate 502.

Each of the RF lines 515 is connected to the RF switch 510 or 511 via a via 516 that penetrates substrate 502, and then via an RF line 517. The RF switches 510 and 511 are single-pole double-throw (SPDT) switches. While the RF switch 510 controls whether to a short or open the connection between each of the pads 506 at the positions A and C and the transmission/reception unit 513, the RF switch 511 controls whether to short or open the connection between each of the pads 506 at the positions B and D and the transmission/reception unit 513.

The connection between each of the pads 506 and the transmission/reception unit 513 may assume a state other than a shorted or opened state. A connection state in which, along with the increased number of terminals that are connectible from each of the SPDT switches, each of the RF lines 509, 517, and 512 is connected to a load such as a resistance falls within the present exemplary embodiment.

As in the first exemplary embodiment, an RF signal that is transmitted or received by the antenna is a circularly polarized wave when the RF signal is a complex wave made up of waves from the four antenna elements 503. The RF signal is a linearly polarized wave when the RF signal is a complex wave made up of waves from any two opposed ones of the antenna elements 503.

Figure 6:
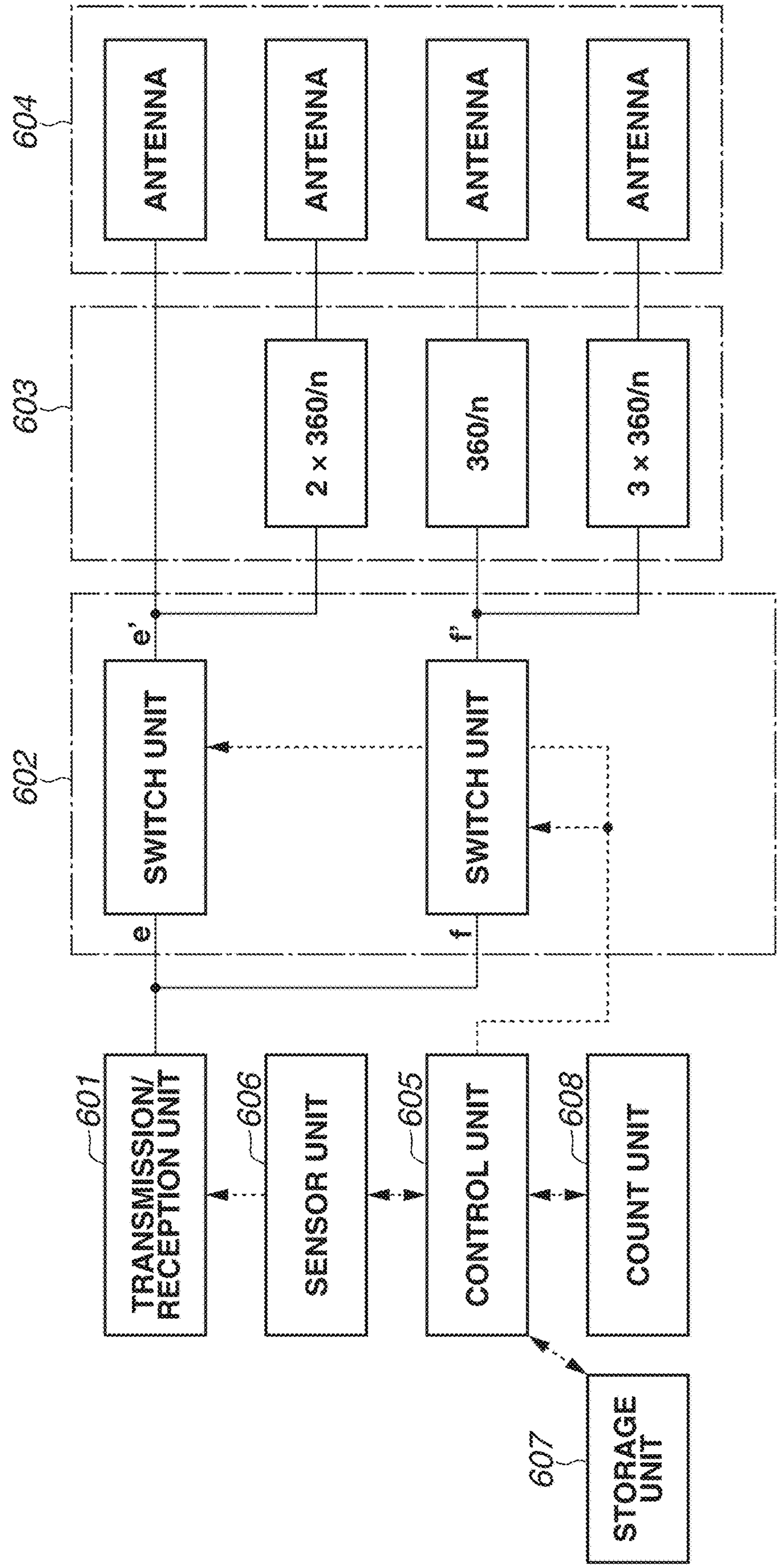
FIG. 6 illustrates functional blocks of the antenna according to the second exemplary embodiment.

Functional blocks of the antenna according to the present exemplary embodiment is illustrated in FIG. 6.

In transmission by the antenna, an RF signal output by the transmission/reception unit 601 branches into two signals, and the two signals are then input to switch units 602 at contacts e and f. The two switch units 602 connects the contact e and a contact e' to each other and the contact f and a contact f' to each other. When the switch units 602 form one or more short circuits, the RF signals output by the switch units 602 each branch into two signals at the contacts e' and f' and then are input to a phase unit 603.

The phase unit 603 rotates the respective phases of the four RF signals input thereto by substantially 0 degrees, 90 degrees, 180 degrees, and 270 degrees, and then output the RF signals to antenna elements 604.

The control unit 605 controls the two switch units 602 based on information from a sensor unit 606, a storage unit 607, and a count unit 608.

In this case, the sensor unit 606 detects the characteristic impedance of the antenna and uses variations in the characteristic impedance to estimate whether there is an object in the proximity thereof. In this estimation, the variations can be measured as reflected wave power obtained by using a directional coupler because the characteristic impedance increases or decreases as a result of having a dielectric body or a conductive body in the proximity of the antenna element 604.

The storage unit 607 retains information on the current and past states of the switch units 602 and the characteristic impedance detected by the sensor unit 606. The count unit 608 measures the number of times the switch units 602 have been controlled.

In reception by the antenna, the functions of the individual blocks are the same as those in transmission, with the only difference being that RF signals reversely pass through the paths. That is, RF signals received by the antenna elements 604 are input to the transmission/reception unit 601 through the phase unit 603 and further through the switch units 602.

Figure 7:
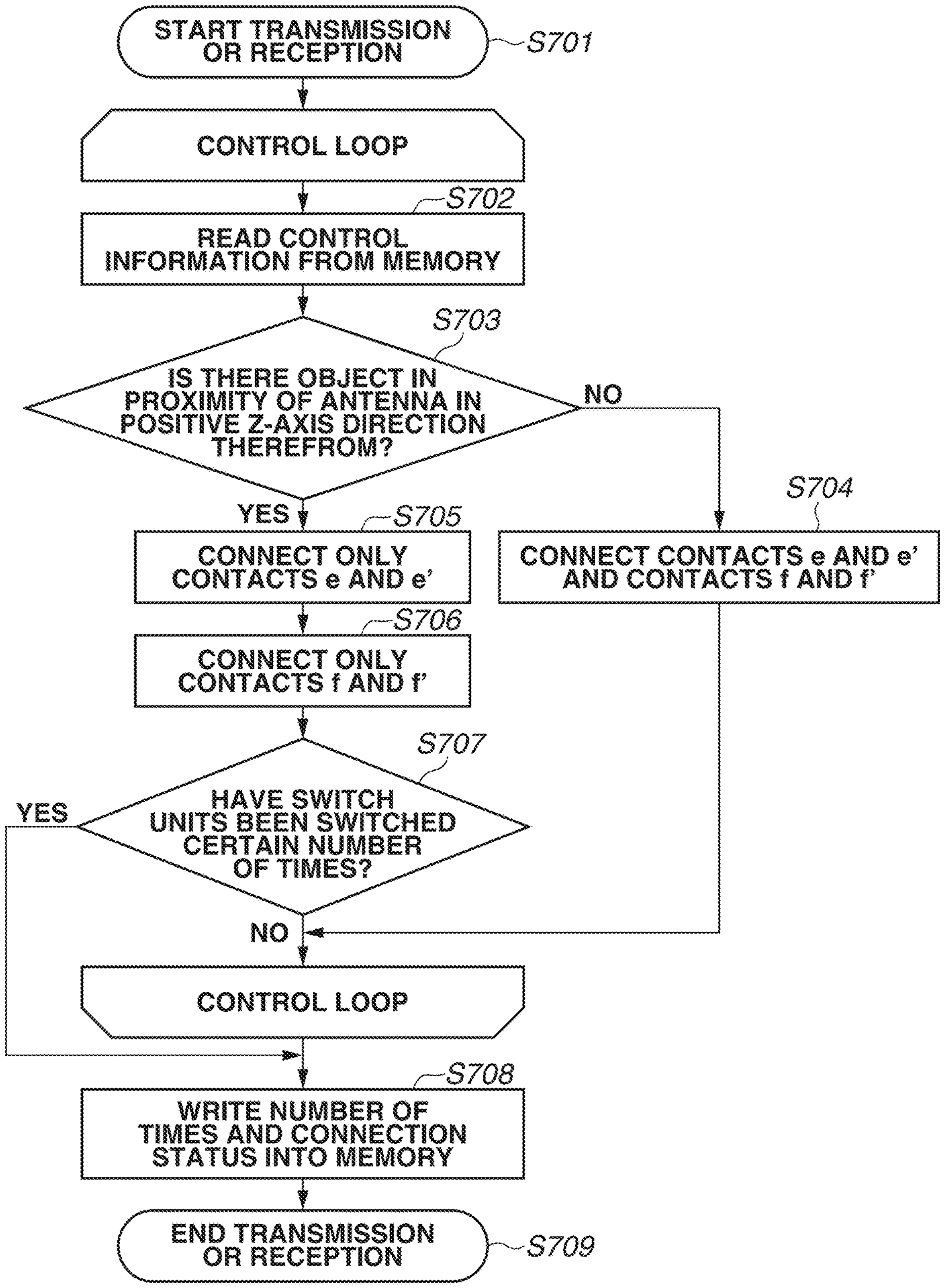
FIG. 7 is a flowchart illustrating operation of the antenna according to the second exemplary embodiment.

FIG. 7 is a flowchart illustrating operation of the antenna illustrated in FIG. 6. The flowchart in FIG. 7 is executed under the control of the control unit 605 included in the antenna.

From the start of transmission or reception of an RF signal (step S701) to the end of the transmission or reception (step S709), the control unit 605 mainly repeatedly executes control on the switch units 602 (steps S702 to S708).

At the start, the control unit 605 reads control information from the storage unit 607 and controls the switch unit 602 based on the control information (step S702). The control information may be the connection statuses of the switch unit 602 at the contacts, which have been defined as default, or may be the connection statuses thereof at the end of previous transmission or reception.

Subsequently, the control unit 605 reads information from the sensor unit 606 on whether there is any object in the proximity of the antenna (step S703). If the control unit 605 determines that there is no object in the proximity of the antenna in the positive Z-axis direction (NO in step S703), the control unit 605 connects the contacts e and e' to each other and the contacts f and f' (step S704) by controlling the switch units 602. If the control unit 605 determines that there is an object in the proximity of the antenna in the positive Z-axis direction (YES in step S703), the control unit 205 connects only the contacts e and e' to each other (step S705) and then connects only the contacts f and f' to each other (step S706) by controlling the switch units 602. Thereafter, the control unit 605 reads, from the storage unit 607, the number of times the switch units 602 have been switched. If the control unit 605 determines that the number of times the switch units 602 have been switched exceeds a threshold (YES in step S707), the operation exits a control loop.

Finally, the control unit 605 writes the number of times the switch units 602 have been switched and the final connection status into the storage unit 607 (steps S708), and ends the transmission or reception (step S709). When the transmission or reception is ended, a notification that the number of times the switch units 602 have been switched exceeds the threshold the control unit 605 may be provided to a user through display on a display unit or via voice. Control to be performed on the switch units 602 may be determined, in such a manner as to interrupt the present operation procedure, by a user through an operation unit or by a system that performs processing on signals transmitted or received by the transmission/reception unit 601.

The present operation sequence is merely an example. The control unit 205 may only implement any of steps S704, S705, and S706 and may implement a different sequence of the steps.

A sequence in which the control unit 205 does not perform any of the processing in steps S704, S705, and S706 if a response has not been received from a communication partner within the predetermined time period is also included.

The present exemplary embodiment enables an RFID system to have an increased reading range for reading RFID tags by radiating linearly polarized RF signals in the frontward, backward, leftward, and rightward directions of the antenna even when an object, such as a human body or a metal object, that interferes with electromagnetic waves is in the proximity of the antenna in face of the front side of the antenna.

The present disclosure can also be implemented as a communication device including the antenna according to either of the above exemplary embodiments. In a case where the antenna according to either of the above exemplary embodiments is used as an antenna for RFID, the antenna can be mounted on a communication device configured to perform RFID communication. Particularly in a case where a communication device used as an RFID reader includes the antenna according to either of the above exemplary embodiments, a user can expect higher use efficiency because the user is saved from the trouble of constantly having to direct the communication device toward RFID tags with which to communicate.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-037064, filed Mar. 4, 2020, which is hereby incorporated by reference herein in its entirety.

What is claimed is:

1. An antenna comprising:

first to Nth antenna elements including a second antenna element, where N is an integer that is four or more; and a control unit configured to control input of signals to each of the first to the Nth antenna elements, wherein, among the first to the Nth antenna elements, each of open ends of the first to the Nth antenna elements extends in a direction substantially 360/N degrees different from a direction in which a corresponding adjacent antenna element of the first to the Nth antenna elements extends, wherein, among signals input to the first to the Nth antenna elements, signals input to the second to the Nth antenna elements have phases that are substantially 360/N degrees different from a phase of a signal input to an adjacent antenna element, wherein the control unit controls input of signals in such a manner as to control a state to be a first state or a second state, where the first state is a state in which signals are input to the first to the Nth antenna elements to radiate a circularly polarized wave in a first direction, and the second state is a state in which signals are input to one or more of the first to the Nth antenna elements to radiate a linearly polarized wave in a direction different from the first direction, and wherein each of the open ends surrounds a power feed end of the corresponding adjacent antenna element.

2. The antenna according to claim 1, wherein, in a case where antenna elements, to which signals that have phases that are substantially 90 degrees, 180 degrees, and 270 degrees different from a phase of the first antenna element are input, are the second antenna element, a third antenna element, and a fourth antenna element, respectively, the control unit controls the state to be the first state in which the signals are input to the first, second, third, and fourth antenna elements to radiate the circularly polarized wave in the first direction or to be the second state in which the signals are input to the first and third antenna elements but not input to the second and fourth antenna elements to radiate the linearly polarized wave in the direction different from the first direction.

3. The antenna according to claim 2, wherein the control unit is configured to control the state to be a third state in which the signals are input to the second and fourth antenna elements but not input to the first and third antenna elements to radiate the linearly polarized wave in a direction different from the first and second directions.

4. The antenna according to claim 1, wherein the first to the Nth antenna elements are provided on a first substrate, each side of which has a length of λ/4, wherein the control unit is provided on a second substrate, each side of which has a length of λ/4, and wherein the first substrate and the second substrate are separated in parallel with each other and at a distance of substantially λ/8.

5. The antenna according to claim 1, further comprising at least one sensor selected from the following: an acceleration sensor, a geomagnetic sensor, a global positioning system, or a reflected power sensor, wherein the control unit controls input of signals to the first to the Nth antenna elements based on a detection result or detection results from the at least one sensor.

6. The antenna according to claim 1, wherein the control unit controls input of signals to the first to the Nth antenna elements in accordance with a received response signal or a timer.

7. The antenna according to claim 1, wherein the antenna is configured to perform radio-frequency identifier (RFID) communication.

8. A communication device comprising the antenna according to claim 1.

9. The antenna according to claim 1, wherein the open ends are end points that do not overlap each other, and the power feed ends are vias.

10. A method for an antenna having first to Nth antenna elements including a second antenna element, where N is an integer that is four or more, the method comprising:

controlling input of signals to each of the first to the Nth antenna elements, wherein, among the first to the Nth antenna elements, each of open ends of the first to the Nth antenna elements extends in a direction substantially 360/N degrees different from a direction in which a corresponding adjacent antenna element of the first to the Nth antenna elements extends, wherein, among signals input to the first to the Nth antenna elements, signals input to the second to the Nth antenna elements have phases that are substantially 360/N degrees different from a phase of a signal input to an adjacent antenna element, wherein controlling includes controlling input of signals in such a manner as to control a state to be a first state or a second state, where the first state is a state in which signals are input to the first to the Nth antenna elements to radiate a circularly polarized wave in a first direction, and the second state is a state in which signals are input to one or more of the first to the Nth antenna elements to radiate a linearly polarized wave in a direction different from the first direction, and wherein each of the open ends surrounds a power feed end of the corresponding adjacent antenna element.

11. The method according to claim 10, wherein, in a case where antenna elements, to which signals that have phases that are substantially 90 degrees, 180 degrees, and 270 degrees different from a phase of the first antenna element are input, are the second antenna element, a third antenna element, and a fourth antenna element, respectively, controlling includes controlling the state to be the first state in which the signals are input to the first, second, third, and fourth antenna elements to radiate the circularly polarized wave in the first direction or to be the second state in which the signals are input to the first and third antenna elements but not input to the second and fourth antenna elements to radiate the linearly polarized wave in the direction different from the first direction.

12. The method according to claim 11, wherein controlling includes controlling the state to be a third state in which the signals are input to the second and fourth antenna elements but not input to the first and third antenna elements to radiate the linearly polarized wave in a direction different from the first and second directions.

13. The method according to claim 10, wherein the first to the Nth antenna elements are provided on a first substrate, each side of which has a length of λ/4, wherein a control unit configured to control input of signals is provided on a second substrate, each side of which has a length of λ/4, and wherein the first substrate and the second substrate are separated in parallel with each other and at a distance of substantially λ/8.

14. The method according to claim 10, wherein the antenna further includes at least one sensor selected from the following: an acceleration sensor, a geomagnetic sensor, a global positioning system, or a reflected power sensor, and wherein controlling includes controlling input of signals to the first to the Nth antenna elements based on a detection result or detection results from the at least one sensor.

15. The method according to claim 10, wherein controlling includes controlling input of signals to the first to the Nth antenna elements in accordance with a received response signal or a timer.

16. The method according to claim 10, wherein the antenna is configured to perform radio-frequency identifier (RFID) communication.

17. The method according to claim 10, wherein the open ends are end points that do not overlap each other, and the power feed ends are vias.

18. A non-transitory computer-readable storage medium storing a program to cause a computer to perform a method for an antenna having first to Nth antenna elements including a second antenna element, where N is an integer that is four or more, the method comprising:

controlling input of signals to each of the first to the Nth antenna elements, wherein, among the first to the Nth antenna elements, each of open ends of the first to the Nth antenna elements extends in a direction substantially 360/N degrees different from a direction in which a corresponding adjacent antenna element of the first to the Nth antenna elements extends, wherein, among signals input to the first to the Nth antenna elements, signals input to the second to the Nth antenna elements have phases that are substantially 360/N degrees different from a phase of a signal input to an adjacent antenna element, wherein controlling includes controlling input of signals in such a manner as to control a state to be a first state or a second state, where the first state is a state in which signals are input to the first to the Nth antenna elements to radiate a circularly polarized wave in a first direction, and the second state is a state in which signals are input to one or more of the first to the Nth antenna elements to radiate a linearly polarized wave in a direction different from the first direction, and wherein each of the open ends surrounds a power feed end of the corresponding adjacent antenna element.

* * * * *